United States Patent
Choi et al.

(10) Patent No.: US 7,756,139 B2
(45) Date of Patent: Jul. 13, 2010

(54) APPARATUS AND METHOD FOR CONVERTING MEGACO PROTOCOL

(75) Inventors: Seung-Han Choi, Gyeonggi-do (KR); Do-Young Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 889 days.

(21) Appl. No.: 11/285,461

(22) Filed: Nov. 21, 2005

(65) Prior Publication Data

US 2006/0109862 A1 May 25, 2006

(30) Foreign Application Priority Data

Nov. 19, 2004 (KR) .................. 10-2004-0095291

(51) Int. Cl.
 H04L 12/28 (2006.01)
(52) U.S. Cl. .............. 370/395.5; 370/356; 370/352; 370/395.3; 370/401
(58) Field of Classification Search .......... 370/352, 370/356, 395.3, 395.5, 466, 401
See application file for complete search history.

(56) References Cited

U.S. PATENT DOCUMENTS

| | | | | |
|---|---|---|---|---|
| 6,766,377 B1* | 7/2004 | Grabelsky et al. | .......... | 709/238 |
| 6,819,678 B2* | 11/2004 | Sylvain | .......... | 370/466 |
| 6,839,342 B1* | 1/2005 | Parham et al. | .......... | 370/352 |
| 6,885,658 B1* | 4/2005 | Ress et al. | .......... | 370/352 |
| 6,904,041 B1* | 6/2005 | Korpi et al. | .......... | 370/401 |
| 7,124,335 B2* | 10/2006 | Choi et al. | .......... | 714/712 |
| 7,126,909 B2* | 10/2006 | Matsuura | .......... | 370/229 |
| 7,145,900 B2* | 12/2006 | Nix et al. | .......... | 370/352 |
| 7,194,071 B2* | 3/2007 | Rupsis | .......... | 379/88.16 |
| 7,411,976 B2* | 8/2008 | Totzke | .......... | 370/467 |
| 7,460,520 B2* | 12/2008 | Cody et al. | .......... | 370/352 |
| 2002/0059404 A1* | 5/2002 | Schaaf et al. | .......... | 709/220 |
| 2002/0078151 A1* | 6/2002 | Wickam et al. | .......... | 709/204 |
| 2003/0002478 A1 | 1/2003 | El-Gebaly et al. | | |
| 2003/0035414 A1* | 2/2003 | Beyda | .......... | 370/352 |
| 2003/0227908 A1* | 12/2003 | Scoggins et al. | .......... | 370/352 |
| 2003/0231623 A1* | 12/2003 | Ryu et al. | .......... | 370/352 |
| 2004/0047342 A1* | 3/2004 | Gavish et al. | .......... | 370/352 |
| 2004/0133624 A1* | 7/2004 | Park | .......... | 709/200 |

(Continued)

FOREIGN PATENT DOCUMENTS

KR 1020040067617 A 7/2004

OTHER PUBLICATIONS

IMS to PSTN/CS interworking, 7th International Conference on Telecommunications, Jun. 11-13, 2003, pp. 701-704.

*Primary Examiner*—Ricky Ngo
*Assistant Examiner*—Dewanda Samuel
(74) *Attorney, Agent, or Firm*—Blakely, Sokoloff, Taylor & Zafman, LLP

(57) ABSTRACT

An apparatus and a method for megaco protocol conversion is provided. The apparatus includes: a plurality of first protocol execution units for receiving a plurality of protocol packets, executing operations according to the received protocols, analyzing the received protocols, and generating protocol execution parameters. Databases store connection information between the objects and protocol conversion functions. A protocol conversion unit interfaces first protocol execution unit and the megaco protocol execution unit, and searches for destination objects and the protocol conversion functions in the database, and converts the generated protocol execution parameters to protocol types of the destination objects, based on condition modes of objects which transmitted the protocol packets.

11 Claims, 10 Drawing Sheets

U.S. PATENT DOCUMENTS

2004/0260824 A1* 12/2004 Berard et al. ............... 709/230
2005/0018652 A1* 1/2005 Crouch et al. ............... 370/352
2005/0094650 A1* 5/2005 Choi et al. .................. 370/401
2006/0045005 A1* 3/2006 Blackmore et al. .......... 370/216

* cited by examiner

APPARATUS AND METHOD FOR CONVERTING MEGACO PROTOCOL

FIELD OF THE INVENTION

The present invention relates to an apparatus and a method for converting megaco protocol; and, more particularly, to an apparatus and a method for executing protocol conversion to enable megaco protocol-applied internet phone terminals, a media gate way and a media gateway controller to communicate with SIP, H.323 or MGCP protocol-applied internet phone terminals, a gatekeeper, a proxy server, a media gateway and a media gateway controller on an internet phone network where various internet phone protocols are used.

DESCRIPTION OF RELATED ARTS

Presently, various internet phone protocols are used for media gateways, media gateway controllers, gate keepers, proxy servers and internet phone terminals which are the equipments that enable internet phone services on an internet phone network. Such internet phone protocols include: a megaco protocol which is a standard protocol of international telecommunications union—telecommunication standardization sector (ITU-T) and internet engineering task force (IETF); an H.323 protocol of ITU-T; a session initiation protocol (SIP) and a media gateway control protocol (MGCP) of IETF.

Referring to FIGS. 1A to 1B, conventional internet phone networks utilizing an H.323 protocol and an SIP protocol are illustrated. Herein, FIG. 1A illustrates an internet phone network utilizing an H.323 protocol, and FIG. 1B illustrates an internet phone network utilizing an SIP protocol.

The H.323 protocol and the SIP protocol are peer-to-peer structured protocols with subscribers' terminal-oriented communicational structures. Therefore, the subscribers' terminals, in other words, internet phone terminals are generally required to include a majority of additional service functions. This causes limitations such as increasing internet phone terminal costs and a need for upgrading the internet phone terminals every time a new additional service function is added. Also, although there are no limitations in direct communications between the internet phone terminals, there are limitations of unstable services of billing, security and quality of service (QoS) in a business model environment wherein an internet telephony service provider (ITSP) operator provides internet phone services.

Referring to FIGS. 2A to 2B, examples of conventional internet phone network utilizing a megaco protocol and an MGCP protocol are illustrated. Herein, FIG. 2A illustrates an internet phone network utilizing a megaco protocol, and FIG. 2B illustrates an internet phone network utilizing a MGCP protocol.

The megaco protocol is a master-slave structured protocol. An internet phone terminal of a subscriber of an internet phone network utilizing a megaco protocol operates in a slave mode which operates in the same manner as a conventional telephone terminal of a public switching telephone networks (PSTN) subscriber (an analog telephone). As a result, the ITSP operator can identify and control conditions of every subscriber's phones through a megaco media gateway controller and execute more efficient internet phone services. Furthermore, all of the additional service functions are concentrated at the media gateway controller, resulting in a much lowered cost to add a new additional service for the internet phone network utilizing the megaco protocol, when compared with the internet phone networks utilizing the H.323 or the SIP protocols.

On the other hand, the MGCP protocol was developed prior to the megaco protocol, and it has the same master-slave structure as the megaco protocol. MGCP protocol is superior to the megaco protocol in stability, but it only supports limited functions of voice-oriented functions when compared with the megaco protocol. The megaco protocol is structured to support multimedia functions such as video, audio and voice functions, and therefore, it will be much more frequently applied to the next generation network (NGN) than the conventional H.323, SIP, and MGCP protocols.

The ITSP operators, presently providing internet phone services, select the internet phone protocols, establish the internet phone networks, and provide the internet phone services according to each of their own business models. Consequently, an ITSP operator uses one of the H.323 protocol internet phone network, the SIP protocol internet phone network and the MGCP protocol internet phone network.

If an existing ITSP operator plans to switchover to an internet phone network utilizing the megaco protocol, it must either replace all of the subscribers' internet phone terminals for H.323/SIP/MGCP protocols with internet phone terminals for the megaco protocol simultaneously, or replace its gate keeper/proxy server/MGCP media gateway controller with a megaco media gateway controller. However, this process causes limitations in services for the subscribers with high costs.

In conclusion, it can be an alternative plan and a new business model for establishing the megaco protocol internet phone network to: have the subscribers use the existing H.323/SIP/MGCP internet phone terminals; install and operate the megaco media gateway controller first; and replace all of the existing H.323/SIP/MGCP internet phone terminals with the megaco internet phone terminals later, instead of replacing all of the existing H.323/SIP/MGCP internet phone terminals with the megaco internet phone terminals or installing the megaco media gateway controller.

Also, for the ITSP operators that desire a complete control of their subscribers of the existing megaco protocol internet phone network, or the ITSP operators that do not wish to spend too much on replacing pro-protocol relay equipments such as a proxy server, it will be a good business model to replace only the subscribers' H.323/SIP internet phone terminals with the megaco internet phone terminals.

To realize the various business models mentioned above, an equipment for executing protocol conversion between the megaco protocol and the H.323/SIP/MGCP protocols is required.

Meanwhile, a media gateway controller that executes conversion between an SIP internet phone protocol and a megaco internet phone protocol is proposed in an article by B. Marsic et al., entitled "IMS to PSTN/CS interworking," *Proceedings of the 7th International Conference on Telecommunications*, June, pp. 701-704, 2003.

However, the above antecedent treatise only suggests a method for converting a protocol between a megaco protocol and a certain internet phone protocol (an SIP protocol), and it does not fundamentally resolve the limitations mentioned above.

SUMMARY OF THE INVENTION

It is, therefore, an object of the present invention to provide an apparatus and a method for converting megaco protocol enabling execution of communications between objects which use different protocols by: searching destination objects and protocol conversion functions by utilizing databases according to condition modes of objects which transmitted protocol packets; and executing protocol conversion.

In accordance with an aspect of the present invention, there is provided an apparatus for converting a megaco protocol to a different protocol, including: a plurality of first protocol execution means for receiving a plurality of different protocol packets, executing operations according to the received protocols, analyzing the received protocols, and generating protocol execution parameters; a megaco protocol execution means for receiving a megaco protocol packet, executing operations according to the received protocol, analyzing the received protocol, and generating protocol execution parameters; databases for storing connection information between the objects and protocol conversion functions; and a protocol conversion means for interworking between the first protocol execution means and the megaco protocol execution means, searching for destination objects and the protocol conversion functions in the database, and converting the generated protocol execution parameters to protocol types of the destination objects, based on condition modes of objects which transmitted the protocol packets.

In accordance with another aspect of the present invention, there is provided a method for megaco protocol conversion, including the steps of: receiving a protocol packet and generating protocol execution parameters; searching an object information database entry by utilizing the generated protocol execution parameters; verifying an object condition mode of the searched object information database entry; verifying a protocol type of a destination object by utilizing the generated protocol execution parameters, based on the verified object condition mode; and converting the generated protocol execution parameters to the verified protocol type of the destination object by utilizing parameter conversion functions.

BRIEF DESCRIPTION OF THE DRAWINGS

The above and other objects and features of the present invention will become better understood with respect to the following description of the specific embodiments given in conjunction with the accompanying drawings, in which.

DETAILED DESCRIPTION OF THE INVENTION

An apparatus and a method for converting megaco protocol in accordance with a specific embodiment of the present invention will be described in detail with reference to the accompanying drawings, which is set forth hereinafter.

Figure 1A:
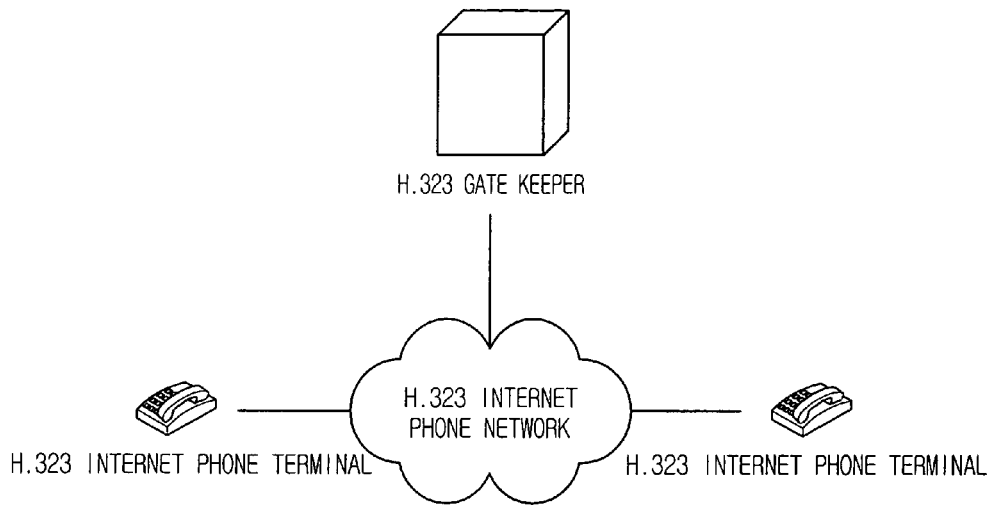
FIGS. 1A to 1B are diagrams illustrating conventional internet phone networks utilizing H.323 and SIP protocols.
Figure 1B:
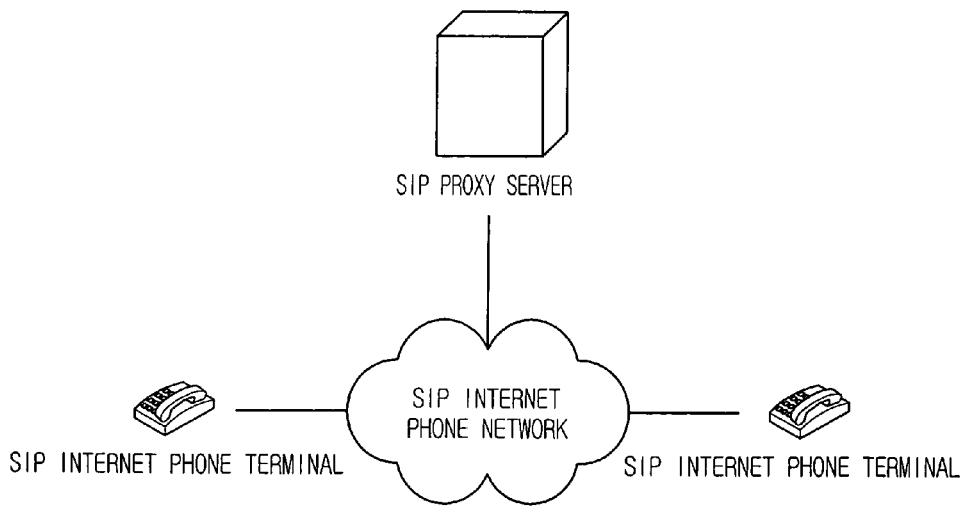
Figure 2A:
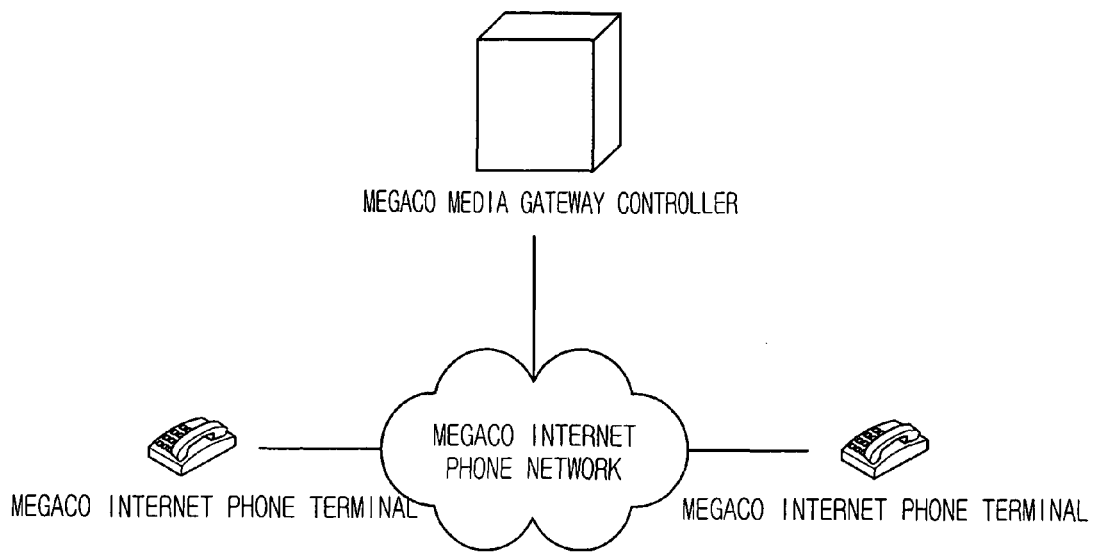
FIGS. 2A to 2B are diagrams illustrating conventional internet phone networks utilizing megaco and MGCP protocols.
Figure 2B:
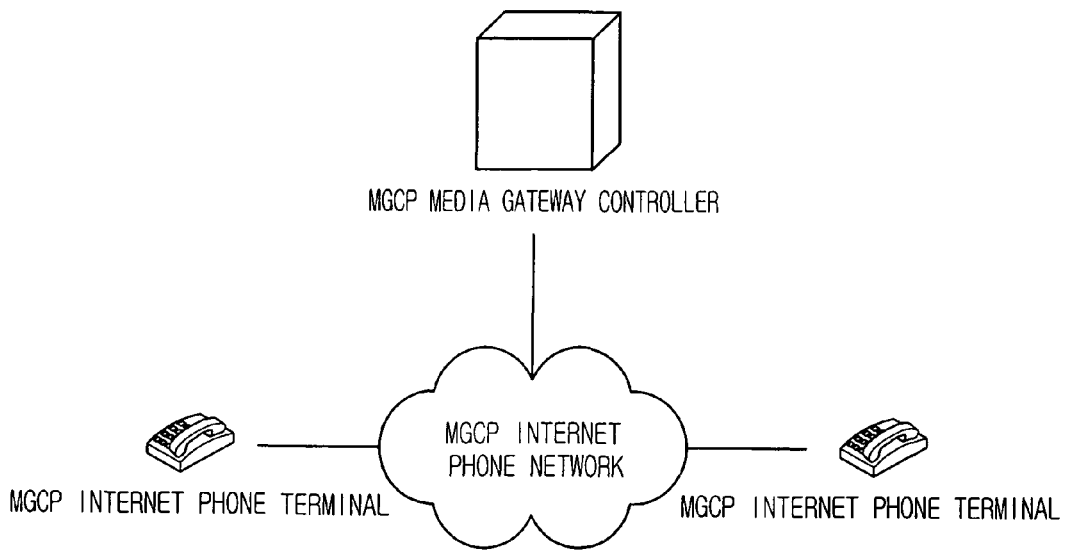
Figure 3:
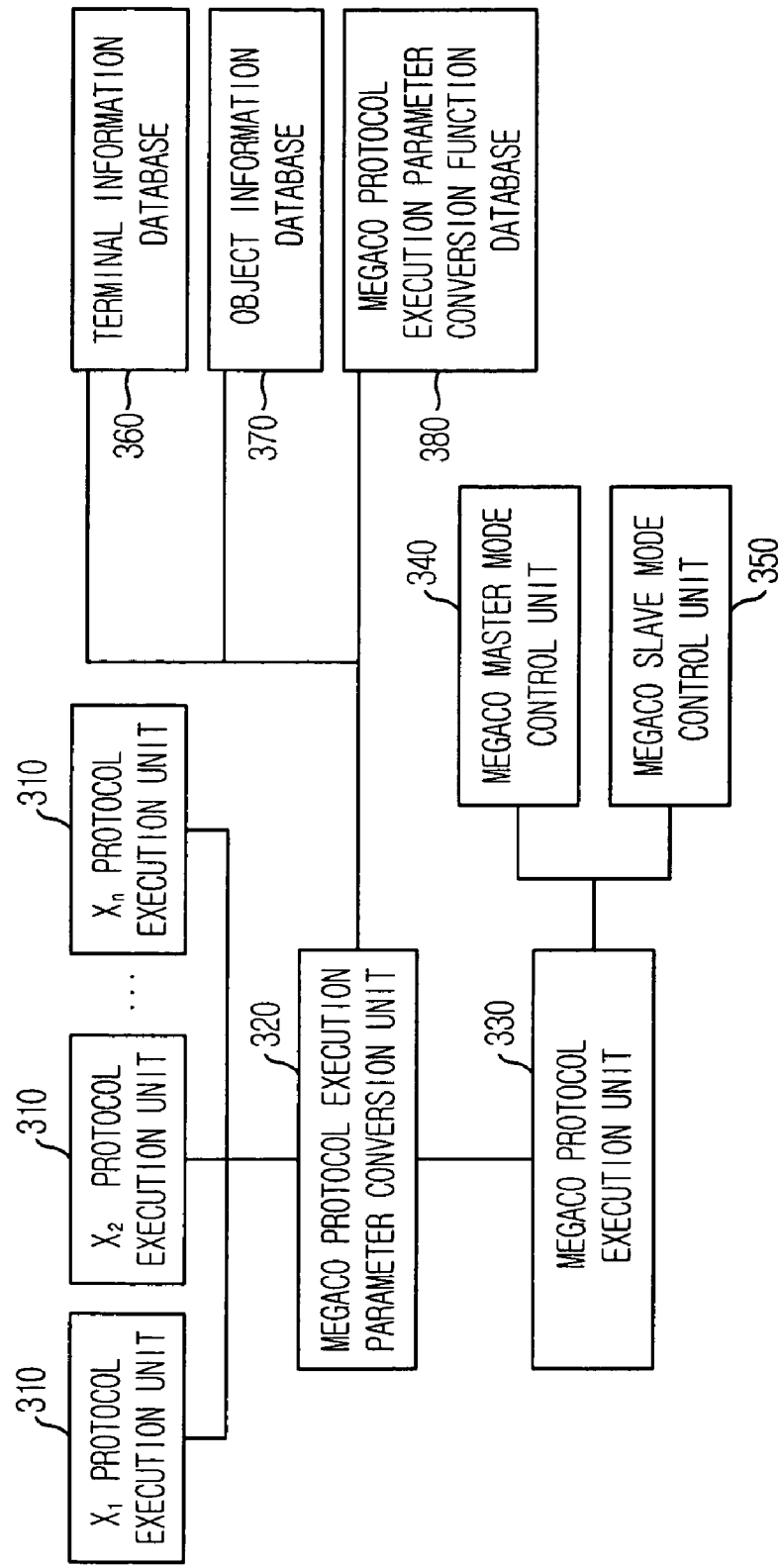
FIG. 3 is a diagram illustrating a megaco protocol conversion apparatus in accordance with a first embodiment of the present invention.

FIG. 3 is a diagram illustrating an example of a megaco protocol conversion apparatus in accordance with a specific embodiment of the present invention.

Referring to FIG. 3, the megaco protocol conversion apparatus in accordance with the present invention includes: $X_k$ number of protocol execution units 310 where 'k' is a number bigger than or equal to 1, and less than or equal to 'n' ($1 \leq k \leq n$); a megaco protocol execution parameter conversion unit 320; a megaco protocol execution unit 330; a megaco master mode control unit 340; a megaco slave mode control unit 350; a terminal information database 360; an object information database 370; and a megaco protocol execution parameter conversion function database 380.

The $X_k$ number of protocol execution units 310 execute internet phone protocols of H.323, SIP and MGCP that are different from a megaco protocol. That is, the $X_k$ number of protocol units 310: receive $X_k$ number of protocol packets from adjacent objects which use the same type of protocols as the $X_k$ number of protocols such as internet phone terminals, a gate keeper, a proxy server, a media gateway controller and a media gateway; analyze the received $X_k$ number of protocol packets and execute appropriate protocol operations according to the present conditions of the $X_k$ number of protocols; and transmit corresponding protocol execution parameters, e.g., condition information and packet parameters to the megaco protocol execution parameter conversion unit 320.

Furthermore, the $X_k$ number of protocol execution units 310: receive the protocol execution parameters necessary for operations from the megaco protocol execution parameter conversion unit 320 to execute appropriate protocol operations; and transmit the $X_k$ number of protocol packets to adjacent objects which use the same type of protocols as the $X_k$ number of protocols such as internet phone terminals, a gate keeper, a proxy server, a media gateway controller and a media gateway.

On the other hand, the megaco protocol execution parameter conversion unit 320 interworks between the $X_k$ number of protocol execution units 310 and the megaco protocol execution unit 330, and executes protocol conversion. At this point, for protocol conversion, the megaco protocol execution parameter conversion unit 320 identifies the mode of the objects which transmitted the protocol packets to the megaco protocol execution parameter conversion unit 320, as either master or slave, based on the transmitted protocol packets. Then, the megaco protocol execution parameter conversion unit 320 identifies other objects which correspond to the objects connected to the megaco protocol conversion apparatus in accordance with the specific embodiment of the present invention. At this time, the megaco protocol execution parameter conversion unit 320 utilizes: the terminal information database 360; the object information database 370; and the megaco protocol execution parameter conversion function database 380.

Figure 4:
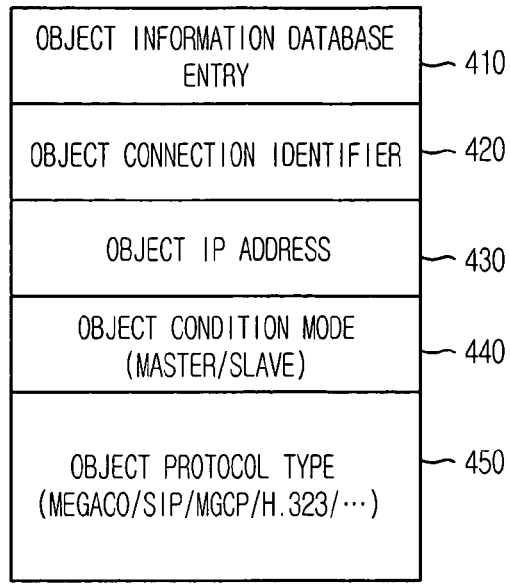
FIG. 4 is a diagram illustrating an object information database shown in FIG. 3.

FIG. 4 is a diagram illustrating the object information database 370 shown in FIG. 3.

Referring to FIG. 4, the object information database 370 includes: an object information database entry 410; an object connection identifier 420 to distinguish connection relations between master mode objects such as a media gateway controller, a gate keeper and a proxy server and slave mode objects such as internet phone terminals and a media gateway; an object IP address 430; an object condition mode 440 to distinguish the mode of an object as master or slave; and an object protocol type 450 to distinguish protocol type of the object.

Figure 5:
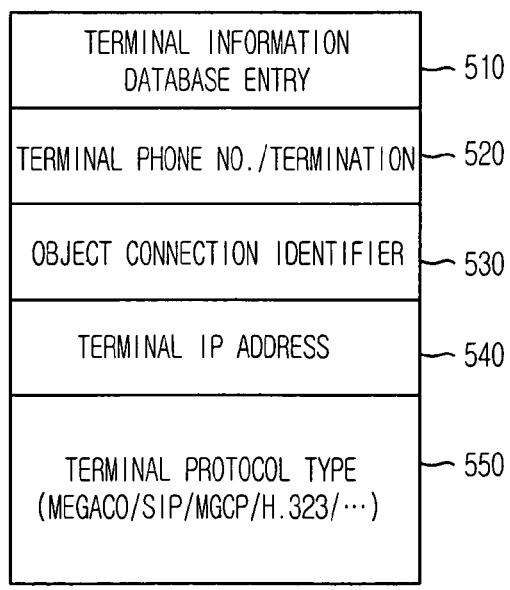
FIG. 5 is a diagram illustrating a terminal information database shown in FIG. 3.

FIG. 5 is a diagram illustrating a terminal information database shown in FIG. 3.

Referring to FIG. 5, the terminal information database 360 includes: a terminal information database entry 510; a terminal phone number or termination identifier 520 to identify a subscriber's information of a terminal; an object connection identifier 530 to distinguish connection relations between master mode objects such as a media gateway controller, a gate keeper and a proxy server and slave mode objects such as internet phone terminals and a media gateway; a terminal IP address 540; and a terminal protocol type 550 to distinguish protocol type of the terminal.

Figure 6:
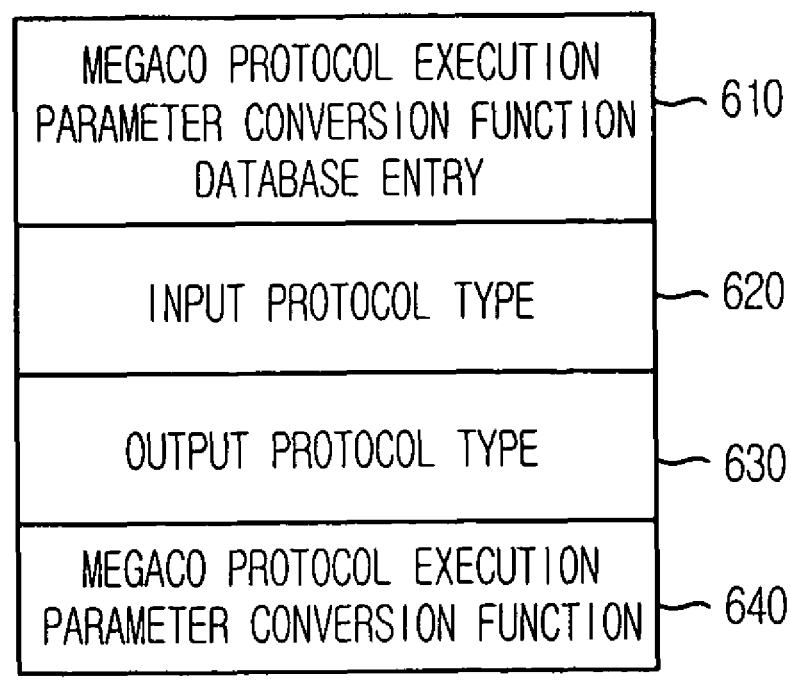
FIG. 6 is a diagram illustrating a megaco protocol execution parameter conversion function database shown in FIG. 3.

FIG. 6 is a diagram illustrating a megaco protocol execution parameter conversion function database shown in FIG. 3.

Referring to FIG. 6, conversion functions are stored in the megaco protocol execution parameter conversion function database 380. The conversion functions are for converting megaco protocol execution parameters to internet phone protocol execution parameters other than the megaco protocol, or converting internet phone protocol execution parameters other than the megaco protocol to megaco protocol execution parameters in reverse. The megaco protocol execution parameter conversion function database 380 also includes: a megaco protocol execution parameter conversion function database entry 610; an input protocol type 620; an output protocol type 630; and a megaco protocol execution parameter conversion function 640.

Referring to FIGS. 4 to 6, the megaco protocol execution parameter conversion unit 320 is described in detail as follows.

The megaco protocol execution parameter conversion unit 320 receives protocol execution parameters from either the $X_k$ number of protocol execution units 310 or the megaco protocol execution unit 330, and identifies the object information database entry 410 from the object information database 370 by utilizing the object IP address as an index. Also, the megaco protocol execution parameter conversion unit 320 verifies condition mode of an object which transmitted protocol packets, as master or slave from the object information database entry 410.

If the object condition mode is master, it is concluded that object condition mode is slave for an object which counters the object which transmitted the protocol packets, that is, a destination object whereto the protocol packets must be transmitted. In other words, an internet phone terminal is the destination object whereto the protocol packets are to be transmitted. Then, the megaco protocol execution parameter conversion unit 320 searches for the terminal information database entry 510 and verifies the protocol type from the terminal information database 360 by utilizing the terminal phone number or termination identifier 520 and the object connection identifier 420 from the protocol execution parameters which were received from either the $X_k$ number of protocol execution units 310 or the megaco protocol execution unit 330.

Also, the megaco protocol execution parameter conversion unit 320 converts the protocol parameters to protocols of the slave mode object by utilizing the terminal protocol type 550 and the terminal IP address 540 from the searched terminal information database entry 510 and the received protocol execution parameters from either the $X_k$ number of protocol execution unit 310 or the megaco protocol execution unit 330. That is, the megaco protocol execution parameter conversion function database entry 610 is searched from the megaco protocol execution parameter conversion function database 380 by utilizing the protocol execution parameters received from either the $X_k$ number of protocol units 310 or the megaco protocol execution unit 330 as an input index, and utilizing the protocol type searched from the terminal information database entry 510 as an output index. Then, the protocol execution parameters received from either the $X_k$ number of protocol execution units 310 or the megaco protocol execution unit 330 which correspond to the input index, are converted to protocol execution parameters of the protocol searched from the terminal information database entry 510 which correspond to the output index. Herein, the searched megaco protocol execution parameter conversion functions are used.

Meanwhile, if the megaco protocol execution parameter conversion unit 320 verifies the condition mode of the object as slave which transmitted the protocol packets from the object information database entry 410, it is concluded that object condition mode is master for an object which counters the object which transmitted the protocol packets, that is, a destination object whereto the protocol packets must be transmitted. In other words, the master mode objects include a media gateway controller, a proxy server and a gate keeper. Hence, the megaco protocol execution parameter conversion unit 320 searches for an object information database entry in master mode from the object information database 370, by utilizing the object connection identifier 420 of the object information database entry 410 as an index.

Furthermore, the megaco protocol execution parameter conversion unit 320 verifies the protocol type of the master mode object from the searched object information database entry in master mode. Also, the megaco protocol execution parameter conversion unit 320 searches for the megaco protocol execution parameter conversion function database entry 610 from the megaco protocol execution parameter conversion function database 380, by utilizing the protocol type of the protocol execution parameters received from either the $X_k$ number of protocol execution units 310 or the megaco protocol execution unit 330 as an input index, and utilizing the protocol type of the above-mentioned master mode object as an output index. Moreover, the megaco protocol execution parameter conversion unit 320 converts the protocol execution parameters corresponding to the input index which were received from either the $X_k$ number of protocol execution units 310 or the megaco protocol execution unit 330, to the protocol execution parameters of the above-searched master mode object protocol corresponding to the output index by utilizing the searched megaco protocol execution parameter conversion functions.

The megaco protocol execution unit 330 executes megaco internet phone protocols. That is, the megaco protocol execution unit 330: receives the megaco protocol packet from an adjacent object that uses the megaco protocol, such as an internet phone terminal, a media gateway controller, an a media gateway; analyzes the received megaco protocol packet; executes appropriate operations according to the present condition of the protocol; and transmits the protocol execution parameters such as the condition information and the packet parameters to the megaco protocol execution parameter conversion unit 320.

Also, the megaco protocol execution unit 330 receives the necessary protocol execution parameters for the protocol execution module to operate from the megaco protocol execution parameter conversion unit 320. Then, the megaco protocol execution unit 330 executes appropriate protocol operations and transmits the megaco protocol packet to an adjacent object that use the megaco protocol such as an internet phone terminal, a media gateway controller and a media gateway.

The megaco master mode control unit 340 controls the megaco protocol execution unit 330 to operate in master mode. The megaco master mode control unit 340 operates in a case where an internet phone terminal utilizes the megaco protocol. The megaco master mode control unit 340 administers connection information such as master-slave connection start information, master-slave connection end information and master-slave change information between the megaco master mode control unit 340 and the internet phone terminal.

The megaco slave mode control unit 350 controls the megaco protocol execution unit 330 to operate in slave mode. The megaco slave mode control unit 350 operates in a case where a media gateway controller utilizes the megaco protocol. The megaco slave mode control unit 350 administers connection information such as master-slave connection start information, master-slave connection end information and master-slave change information between the megaco slave mode control unit 350 and the media gateway controller.

Figure 7:
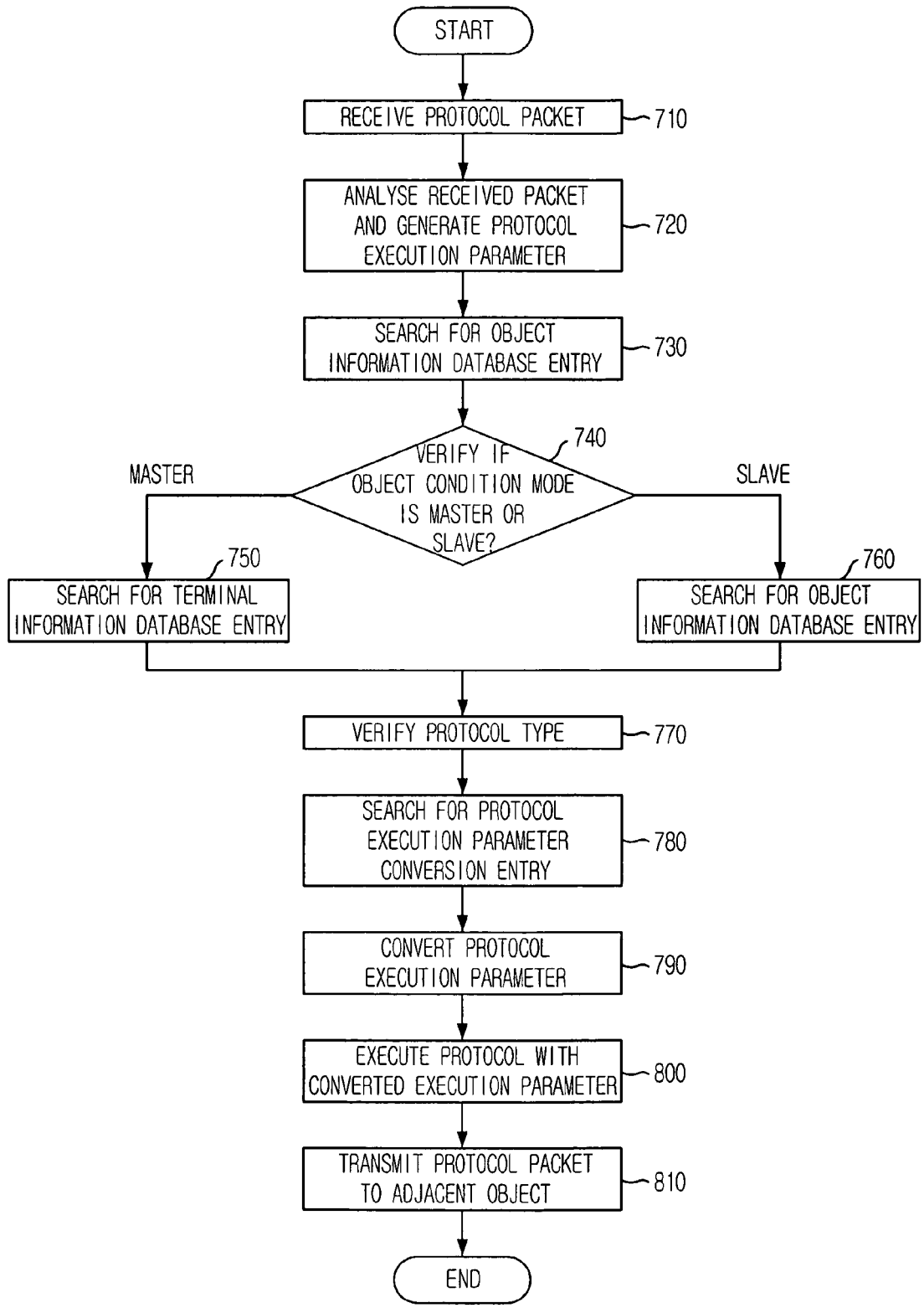
FIG. 7 is a flow-chart illustrating an example of a megaco protocol conversion method in accordance with a second embodiment of the present invention.

FIG. 7 is a flow-chart illustrating a megaco protocol conversion method in accordance with an embodiment of the present invention.

Referring to FIG. 7, at step 710, a protocol packet is received firstly through the $X_k$ number of protocol execution units 310 or the megaco protocol execution unit 330.

Subsequently, at step 720, the received packet is analyzed and protocol execution parameters are generated. Then, at step 730, an object information database entry is searched from the object information database 370 by utilizing an object IP address information from the generated protocol execution parameters at step 720 as an index.

Afterwards, the object condition mode searched in object information database entry at step 730 is verified as master or slave at step 740.

If the object condition mode is master, a terminal information database entry is searched at step 750 from the terminal information database 360 by utilizing a terminal phone number or termination identifier of the above-generated protocol execution parameters at the step 720 and an object connection identifier of the above-searched object information database entry at step 730 as indexes.

After that, protocol type of the terminal information database entry searched at step 750 is verified at step 770.

Next, a megaco protocol execution parameter conversion function database entry is searched at step 780 from the megaco protocol execution parameter conversion function database 380 utilizing the protocol type of the above-generated protocol execution parameters as an input index, and the protocol type of the above-verified terminal information database entry as an output index.

Subsequently, protocol execution parameters of the protocol which correspond to the input index are converted to protocol execution parameters of the protocol which correspond to the output index at step 790, utilizing megaco protocol execution parameter conversion functions of the megaco protocol execution parameter conversion function database entry.

Afterwards, a protocol is executed with the above-converted protocol execution parameters through either the $X_k$ number of protocol execution units 310 or the megaco protocol execution unit 330 at step 800, and then the protocol packet is transmitted to an adjacent object at step 810.

Meanwhile, if the object condition mode is slave in the reference numeral 740 stage, an object information database entry of a master mode object is searched at step 760 from the object information database by utilizing an object connection identifier of the object information database entry which was searched at step 730 as an index. The object identified as slave corresponds to an internet phone terminal. This above process is to find information of a media gateway controller, a gate keeper and a proxy server.

Next, protocol type of the object information database entry is verified at step 770. Then, a megaco protocol execution parameter conversion function database entry is searched at step 780 from the megaco protocol execution parameter conversion function database 380, utilizing the protocol type of the above-generated protocol execution parameters as an input index, and the protocol type of the above-searched object information database entry as an output index.

Afterwards, the protocol execution parameters of the protocol which correspond to the input index are converted to the protocol execution parameters of the protocol which correspond to the output index by utilizing the megaco protocol execution parameter conversion functions at step 790.

After that, a protocol is executed with the above-converted protocol execution parameters through either the $X_k$ number of protocol execution units 310 or the megaco protocol execution unit 330 at step 800, and then the protocol packet is transmitted to an adjacent object at step 810.

Figure 8A:
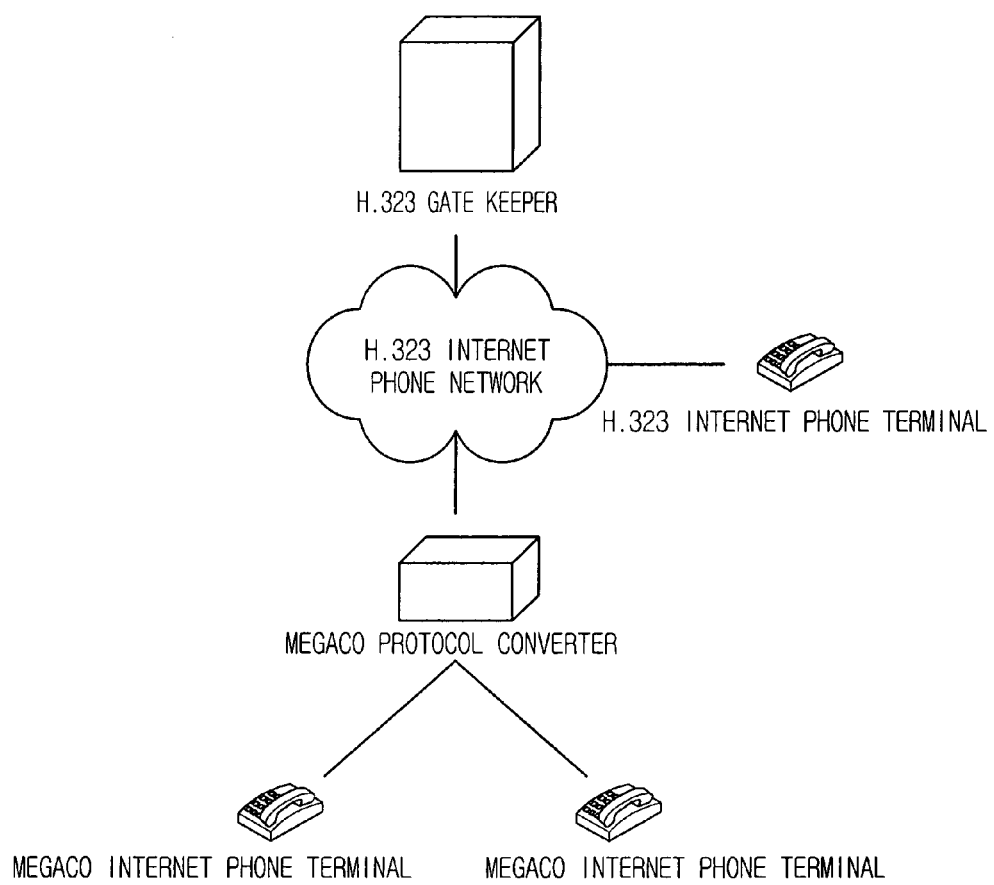
FIGS. 8A to 8B are diagrams illustrating examples of internet phone networks with applications of megaco protocol conversion apparatuses in accordance with a third embodiment of the present invention.
Figure 8B:
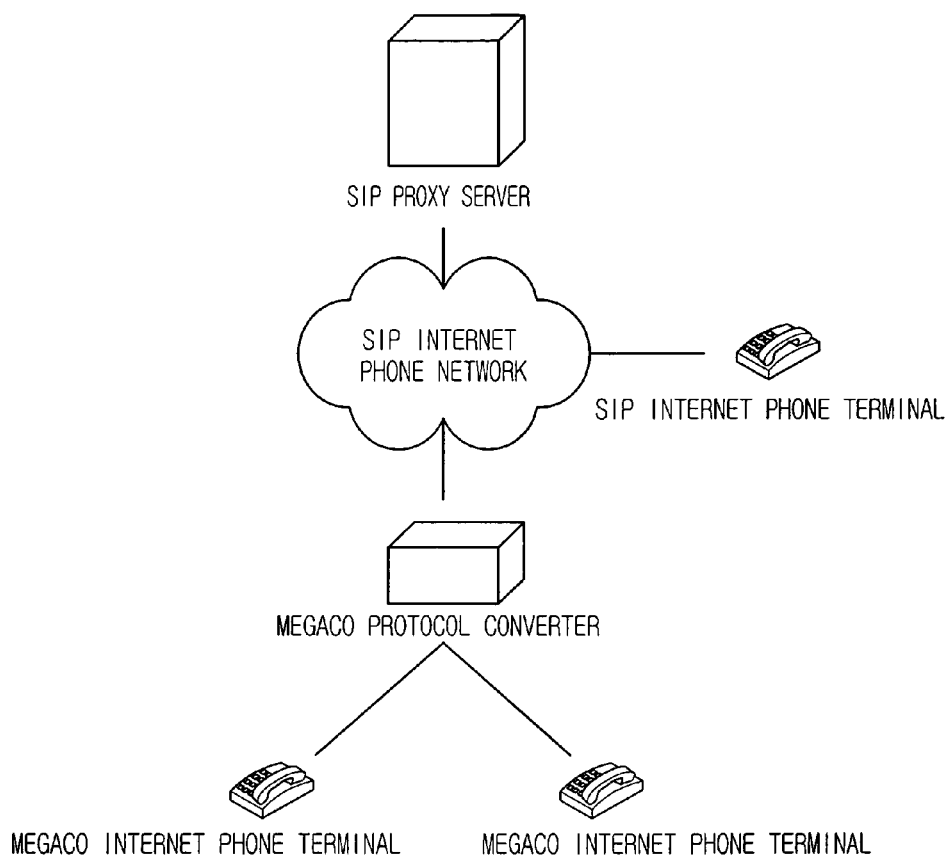

FIGS. 8A to 8B are diagrams illustrating examples of internet phone networks with applications of megaco protocol conversion apparatuses in accordance with the present invention.

FIG. 8A is a diagram illustrating an example of a conventional H.323 internet phone network whereon a megaco protocol conversion apparatus is applied to connect megaco internet phone terminals in accordance with the specific embodiment of the present invention. FIG. 8B is a diagram illustrating another example of a conventional SIP internet phone network whereon a megaco protocol conversion apparatus is applied to connect megaco internet phone terminals in accordance with the specific embodiment of the present invention.

Figure 9A:
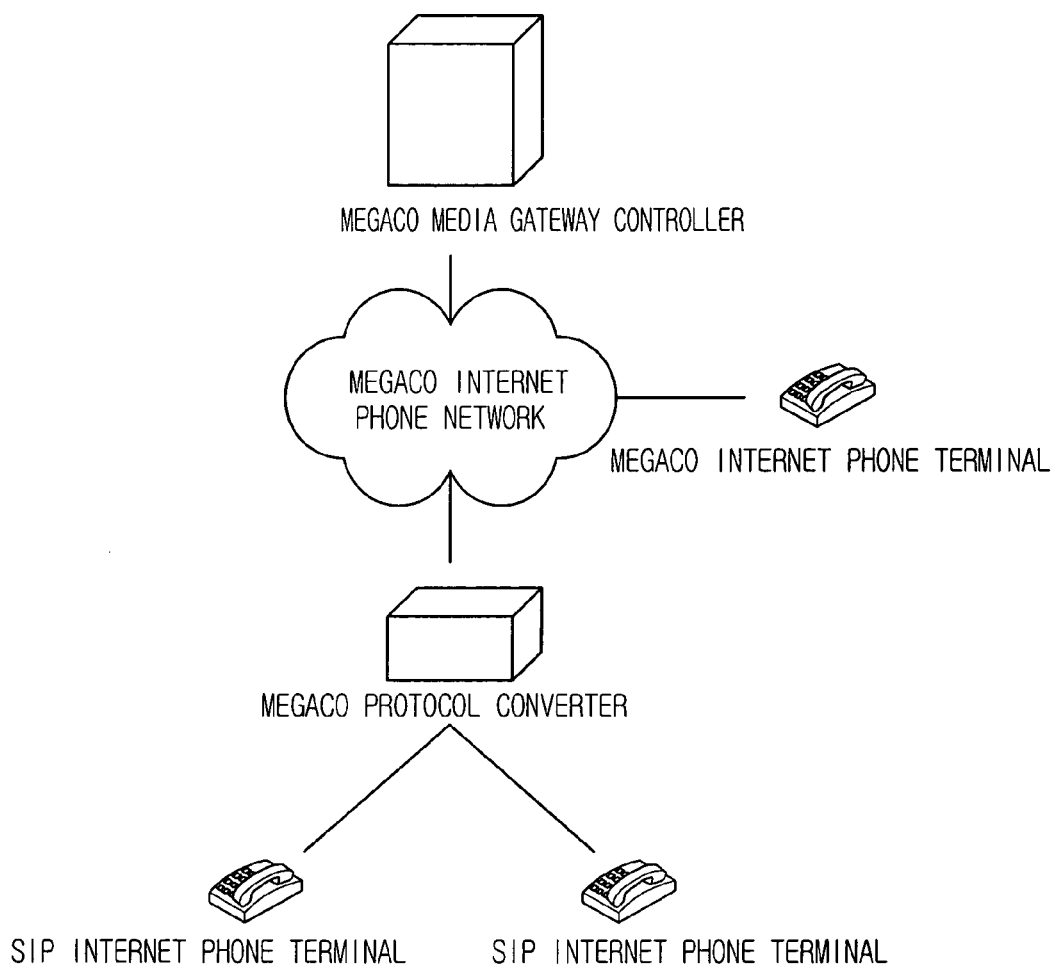
FIGS. 9A to 9B are diagrams illustrating other examples of internet phone networks with applications of megaco protocol conversion apparatuses in accordance with a forth embodiment of the present invention.
Figure 9B:
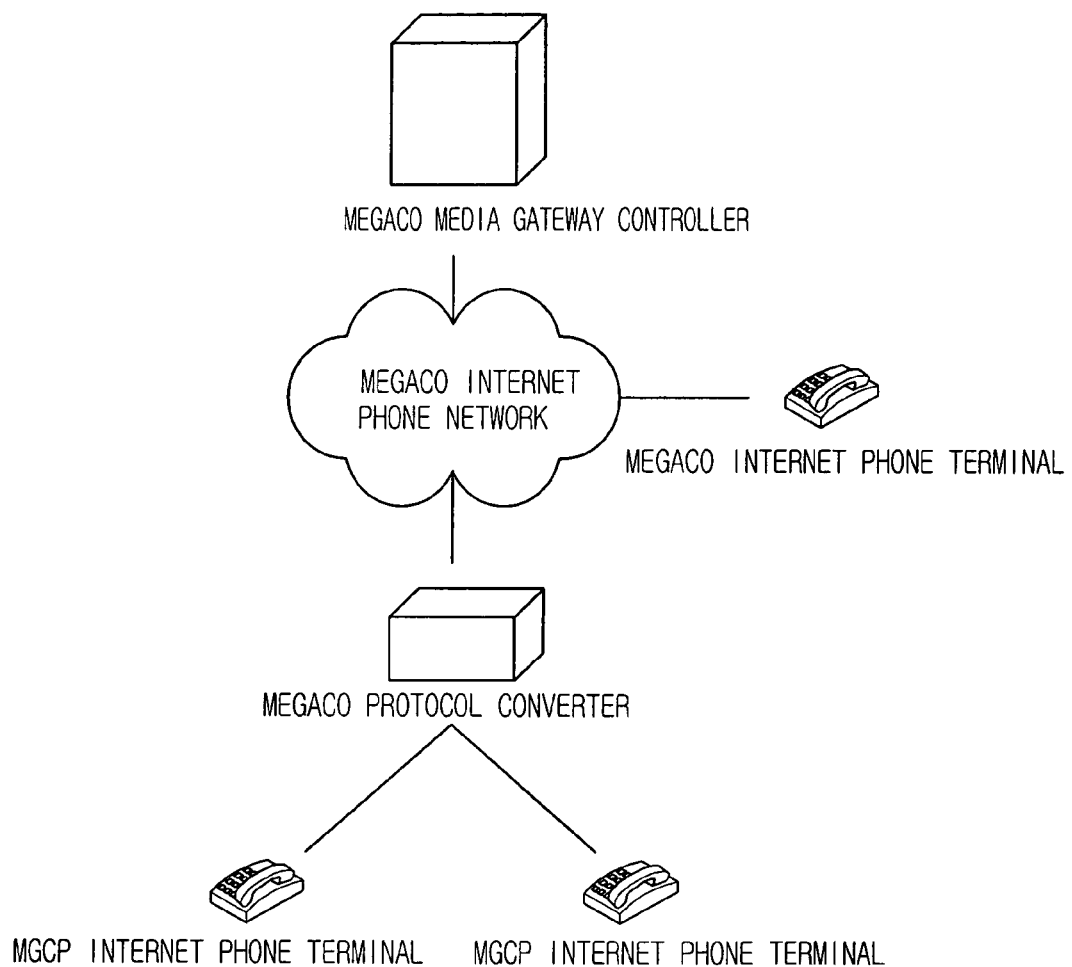

FIG. 9A to 9B are diagrams illustrating other examples of internet phone networks with applications of megaco protocol conversion apparatuses in accordance with the specific embodiment of the present invention.

FIG. 9A is a diagram illustrating an example of a megaco internet phone network whereon a megaco protocol conversion apparatus is applied to connect existing SIP internet phone terminals in accordance with the specific embodiment of the present invention. FIG. 9B is a diagram illustrating another example of a megaco internet phone network whereon a megaco protocol conversion apparatus is applied to connect existing MGCP internet phone terminals in accordance with the specific embodiment of the present invention.

The above described embodiment of the present invention may be embodied in program and can be stored in recordable media such as CD-ROMs, RAMs, ROMs, floppy disks, hard disks and magnetic optical disks. Since the process can be easily practiced by those skilled in the art, it will not be described further herein.

In a case where it is desired to use an SIP, an H.323 or an MGCP protocol internet phone network as a megaco protocol applied network, the above described embodiment of the present invention reduces subscribers' terminal equipment replacement cost and testing cost needed for equipment replacement because there is no need to change subscribers'

SIP, H.323 or MGCP protocol internet phone terminals to megaco protocol internet phone terminals.

Furthermore, the above described embodiment of the present invention reduces purchasing cost of high-capacity megaco protocol media gateway controller equipment and testing cost needed for equipment installation, to supply internet phone services to subscribers with megaco protocol internet phone terminals only.

Also, the above described embodiment of the present invention is designed in a modularized structure with expandability, and reduces time and cost for transplanting a new internet phone protocol into a megaco protocol conversion apparatus.

The present application contains subject matter related to the Korean patent application No. KR 2004-0095291, filed in the Korean Patent Office on Nov. 19, 2004, the entire contents of which being incorporated herein by reference.

While the present invention has been described with respect to certain specific embodiments, it will be apparent to those skilled in the art that various changes and modifications may be made without departing from the spirit and scope of the invention as defined in the following claims.

What is claimed is:

1. An apparatus for converting a megaco protocol to a different protocol, comprising:
   a plurality of first protocol execution means for receiving a plurality of different protocol packets, executing operations according to the received protocols, analyzing the received protocols, and generating protocol execution parameters;
   a megaco protocol execution means for receiving a megaco protocol packet, executing operations according to the received protocol, analyzing the received protocol, and generating protocol execution parameters;
   databases for storing connection information between objects and protocol conversion functions; and
   a protocol conversion means for interworking between the first protocol execution means and the megaco protocol execution means, verifying an object condition mode of an object which transmitted the protocol packets as master or slave; searching for destination objects and the protocol conversion functions in the database, and converting the generated protocol execution parameters to protocol types of the destination objects, based on the object condition mode,
   wherein the databases include:
   an object information database containing object information database entries, each entry associating an object connection identifier to a protocol type of a destination object, the object information database searched by the protocol conversion means when the object condition mode is verified to be slave to determine the protocol type of the destination object; and
   a terminal information database containing terminal information database entries, each entry associating a termination identifier and the object connection identifier to the protocol type of the destination object, the terminal information database searched by the protocol conversion means when the object condition mode is verified to be master to determine the protocol type of the destination object.

2. The apparatus as recited in claim 1, further including:
   a master mode control means for controlling the megaco protocol execution means to operate in the master mode; and
   a slave mode control means for controlling the megaco protocol execution means to operate in the slave mode.

3. The apparatus as recited in claim 1, wherein the databases include:
   the object information database including the object connection identifier for distinguishing connection relations between a master mode object and a slave mode object, an object IP address, the object condition mode for distinguishing an object mode and the protocol type of the object;
   the terminal information database including a terminal subscriber's information identifier, the object connection identifier for distinguishing connection relations between a master mode object and a slave mode object, a terminal IP address, and the protocol type of the terminal; and
   a conversion function database including an input protocol type, an output protocol type and conversion functions.

4. The apparatus as recited in claim 2, wherein the databases include:
   the object information database including the object connection identifier for distinguishing connection relations between a master mode object and a slave mode object, an object IP address, the object condition mode for distinguishing an object mode and the protocol type of the object;
   the terminal information database including a terminal subscriber's information identifier, the object connection identifier for distinguishing connection relations between a master mode object and a slave mode object, a terminal IP address, and the protocol type of the terminal; and
   a conversion function database including an input protocol type, an output protocol type and conversion functions.

5. The apparatus as recited in claim 3, wherein the protocol conversion means includes:
   means for determining the object condition mode from the object information database by utilizing the generated protocol execution parameters;
   means for determining the protocol type of the destination object from the terminal information database if the object condition mode is master;
   means for determining the protocol type of the destination object from the object information database if the object condition mode is slave; and
   means for converting the generated protocol execution parameters to the determined protocol type of the destination object by utilizing the conversion functions stored in the conversion function database.

6. The apparatus as recited in claim 4, wherein the protocol conversion means includes:
   means for determining the object condition mode from the object information database by utilizing the generated protocol execution parameters;
   means for determining the protocol type of the destination object from the terminal information database if the object condition mode is master;
   means for determining the protocol type of the destination object from the object information database if the object condition mode is slave; and
   means for converting the generated protocol execution parameters to the determined protocol type of the destination object by utilizing the conversion functions stored in the conversion function database.

7. A non-transitory computer readable storage medium including instructions that, when executed by a processing system, cause the processing system to perform a method for megaco protocol conversion, the method comprising the steps of:

a) receiving a protocol packet and generating protocol execution parameters;
b) searching an object information database entry by utilizing the generated protocol execution parameters, said database entry including identity of an object which transmitted the received protocol packet;
c) verifying an object condition mode of the searched object information database entry;
d) verifying a protocol type of a destination object by utilizing the generated protocol execution parameters, based on the verified object condition mode; and
e) converting the generated protocol execution parameters to the verified protocol type of the destination object based on the verified condition modes by utilizing parameter conversion functions;

wherein said step of d) includes the steps of:

searching a terminal information database entry by utilizing a terminal identifier from the generated protocol execution parameters and the object connection identifier from the object information database entry as an index, if an object condition mode is master;

searching an object information database entry of a master mode object by utilizing the object connection identifier of the object information database entry as an index, if the object condition mode is slave; and verifying a protocol type of the searched database entry.

8. The non-transitory computer readable storage medium of claim 7, wherein said step b) is carried out by utilizing an object IP address from the generated protocol execution parameters as an index.

9. The non-transitory computer readable storage medium of claim 8, wherein the object information database entry includes:

an object connection identifier for distinguishing connection relations between a master mode object and a slave mode object;
an object IP address;
an object condition mode for distinguishing an object mode; and
a protocol type of the object.

10. The non-transitory computer readable storage medium of claim 7, wherein the terminal information database entry includes:

a terminal subscriber's information identifier;
an object connection identifier for distinguishing connection relations between a master mode object and a slave mode object;
a terminal IP address; and
a protocol type of the terminal.

11. The non-transitory computer readable storage medium of claim 7, wherein said step e) includes the steps of:

searching a parameter conversion function database entry by utilizing a protocol type of the generated protocol execution parameters as an input index, and the protocol type of the verified destination object as an output index; and converting the generated protocol execution parameters to a protocol type of the destination object by utilizing the conversion functions of the searched parameter conversion function database entry.

* * * * *